(12) United States Patent
Sawai

(10) Patent No.: US 6,671,123 B2
(45) Date of Patent: Dec. 30, 2003

(54) MAGNETIC TAPE DEVICE

(75) Inventor: Kunio Sawai, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 168 days.

(21) Appl. No.: 09/962,569

(22) Filed: Sep. 25, 2001

(65) Prior Publication Data

US 2002/0093755 A1 Jul. 18, 2002

(30) Foreign Application Priority Data

Sep. 26, 2000  (JP) .................................... 2000-006943 U

(51) Int. Cl.$^7$ ............................................ G11B 15/675
(52) U.S. Cl. .................................................... 360/96.5
(58) Field of Search ........................................ 360/96.5

(56) References Cited

U.S. PATENT DOCUMENTS 5,214,548 A  *  5/1993  Nakanishi ................... 360/96.5

FOREIGN PATENT DOCUMENTS

| JP | 58-141461 | 8/1983 |
| JP | 2-260163 | 10/1990 |
| JP | 11-250535 | 9/1999 |

OTHER PUBLICATIONS

Patent Abstracts of Japan, Publication No. 11–250535, Publication Date Sep. 17, 1999, 1 page.
Patent Abstracts of Japan, Publication No. 02–260163, Publication Date Oct. 22, 1990, 1 page.

* cited by examiner

*Primary Examiner*—Robert S. Tupper
(74) *Attorney, Agent, or Firm*—Rosenthal & Osha L.L.P.

(57) ABSTRACT

A pair of float prevention members 4f are formed at the upper ends of side plates 4b of a moving table 4 to engage the upper edge of a tape cassette T. A pair of integrally formed gripping members 4e are projected inward at the corners between the float prevention members 4f and the side plates 4b, and are brought into contact with the side faces of the tape cassette T when it is inserted in to the moving table 4. A bottom plate 4a of the moving table 4 is flexible steel. When the bottom plate 4a is flexed by inserting the tape cassette T between the gripping members 4e, due to the urging force thus generated, the gripping members 4e are flexibly brought into contact with the side faces of the tape cassette T.

6 Claims, 11 Drawing Sheets

MAGNETIC TAPE DEVICE

BACKGROUND OF THE INVENTION

1. Technical Field

The present invention relates to a magnetic tape device, having a simple and inexpensive structure, that can hold a tape cassette at a predetermined location on a moving table without unexpectedly wobbling.

2. Related Art

An example conventional technique for a magnetic tape device, disclosed in the Unexamined Japanese Patent Application Publication No. Sho58-141461, will be described while referring to FIGS. 10 to 12. An upright pair of guide plates 3a and 3b are provided in parallel on a chassis 2 in a housing 1, and multiple guide pins 5 project from either side of a tape cassette moving table 4, located between the guide plates 3a and 3b. When these guide pins 5 are movably inserted into multiple L-shaped guide holes 6 that penetrate the guide plates 3a and 3b, the moving table 4 can move forward and backward, in directions a and b, between a cassette insertion position A and a cassette mounting position B. Then, rotary levers 8 are fitted over a shaft 7 with the guide plates 3a and 3b so that the levers 8 are pivotable forward and backward, in directions c and d, and engage the front guide pins 5. A worm gear 10 is disposed in the center of the outer face of a rotary cam 9 that is rotatably positioned on the reverse face of the chassis 2, and a worm gear 11, which is driven by a driving source (not shown), engages the worm gear 10. A bevel gear 12 is formed on the upper, outer face of the rotary cam 9, and a gear 13 is formed at the base end of the rotary lever 8, which is coupled with the gear 13 by a clutch gear mechanism 14. A top board 15 bridges the distance between the guide plates 3a and 3b.

In FIG. 10, reference numeral 17 denotes movable tape guide posts, along which a magnetic tape t is pulled out of a tape cassette T and passes around a head cylinder 18. Reference numeral 19 denotes a full-width erasing head; 20, a speech erasing head; 21, a speech control head; 22, fixed tape guide posts; 23, back tension posts; 24, a capstan; and 25, a pinch roller.

With this configuration, as is indicated by a solid line in FIG. 12, while the moving table 4 is held in the cassette insertion position A, the tape cassette T is loaded into a tape cassette insertion slot 1a of the housing 1. Then, since the clutch of the gear mechanism 14 is disengaged, as the tape cassette T is inserted toward the movable table 4, the movable table 4 is pushed slightly to the rear, in direction b. Based on a detection signal from a detector (not shown) that detects the insertion, the clutch of the gear mechanism 14 is engaged by the driving source through the worm gears 11 and 10 and the rotary cam 9, and the rotary cam 9 and the rotary lever 8 interact via the gear mechanism 14. Thereafter, when the rotary lever 8 is pivoted to the rear, in direction d, by the driving source, the moving table 4 is displaced horizontally along the guide holes 6 to the rear, in direction b, descending vertically until the tape cassette T is mounted in the cassette mounting position B (see imaginary line in FIG. 12). Then, the magnetic tape t is extracted from the tape cassette T (see imaginary line in FIG. 10), and the reproduction and other operations are performed.

Further, when an eject button (not shown) is depressed, based on an ejection signal that is emitted, the rotary lever 8 is pivoted forward, in direction c, by the driving force transmitted by the gear mechanism 14. The moving table 4 at the cassette mounting position B is raised vertically along the guide holes 6 and is moved forward, in direction a, to the cassette insertion position A, and the tape cassette T is ejected (see solid line in FIG. 12).

As is shown in FIGS. 10 to 12, the moving table 4 includes a bottom plate 4a and a pair of side plates 4b, which are secured to the side edges of the bottom plate 4a and from the side walls of which the guide pins 5 project. A pair of leaf springs 4d are securely attached to projections 4c that project inward, toward the center of the moving table 4, from the upper edges of the side plates 4b. The tape cassette T is held at a predetermined location on the moving table 4 by the urging force exerted by the leaf springs 4d, while the distal ends of the leaf springs 4d contact the upper face of the tape cassette T seated on the moving table 4. Thus, unexpected wobbling of the tape cassette is encountered upon its insertion and ejection.

Problems to be Solved

With the above arrangement, since the leaf springs 4d are employed to hold the tape cassette T in a predetermined position in the moving table 4, the number of parts is increased due to these leaf springs 4d, and the structure is complicated. In addition, a great deal of labor and time are required to fix the leaf springs 4d to the projections 4c, so that the manufacturing method is demanding and the manufacturing expenses are increased.

To resolve the shortcomings, it is one objective of the present invention to provide a magnetic tape device, having a simple and inexpensive structure, that can hold a tape cassette in a predetermined position in a moving table without the tape cassette wobbling unexpectedly.

SUMMARY OF THE INVENTION

Means for Solving the Problems

To achieve this objective, according to a first aspect of the invention, a magnetic tape device is provided wherein a moving table includes a bottom plate and a pair of side plates securely fixed to side edges of the bottom plate, and is positioned so as to move forward and backward between a cassette insertion position and a cassette mounting position located between a pair of guide plates;

wherein a tape cassette is inserted into and held in the moving table, located at the cassette insertion position, and the moving table is moved backward based on a detection signal produced upon the insertion of tape cassette, so that the tape cassette, in the moving table, is mounted at the cassette mounting position;

wherein a pair of integrally formed float prevention members, project inward from the upper ends of the side plates, toward the center of the moving table, and engage the upper edge of the tape cassette that is held in the moving table;

wherein a pair of projecting gripping members contact both side faces of the tape cassette inserted into and held in the moving table;

wherein the gripping members have a substantially trapezoid shape in plan view, the gripping members extending forward and backward along the side plates and inclining at both longitudinal ends toward the center of the moving table;

wherein the bottom plate, made of flexible steel, is bent in the center to form a substantially longitudinal reinforcing projection extending upward toward the moving table; and wherein, when the side faces of the tape cassette inserted into the moving table are brought into contact with the gripping members, the bottom plate is flexed, and the urging force thus generated presses the gripping members flexibly against the side faces of the tape cassette.

According to this arrangement, the integrally formed float prevention members and gripping members are projected substantially at right angles at the upper ends of the side plates of the moving table. Therefore, when a tape cassette is inserted into the moving table, the float prevention members and the gripping members are brought into contact with the upper edge corners of the side faces of the tape cassette, so that the tape cassette can be securely held in a predetermined position in the moving table.

Further, the bottom plate is formed of flexible steel, and the reinforcement projection is formed by bending the center portion of the bottom plate. With this arrangement, an urging force exerting a predetermined pressure is generated by pushing the tape cassette between the gripping members, thereby flexing the bottom plate and forcing the gripping members flexibly against the side faces of the tape cassette, holding the tape cassette in the moving table so that it will not wobble unexpectedly.

Further, when the inclined end faces of the trapezoidal shaped gripping members are used as guide faces, the tape cassette can be smoothly inserted into the moving table. Further, since the inner side faces of the gripping members can contact both side faces of the tape cassette, the tape cassette can be stably held in the moving table.

Since an integrally formed pair of gripping members are projected from the inner side faces of the side plates, the number of parts is smaller than in the conventional case, wherein leaf springs are used, and the structure is simpler. When the gripping members and the floating prevention members, as well as the side plates, are formed of a synthetic resin, the manufacturing costs can be reduced.

According to a second aspect of the invention, in the magnetic tape device of the first aspect, the heights of the gripping members are set to be in a range from one to three times the thicknesses thereof.

With this arrangement, if the heights of the gripping members are less than the thicknesses of the members, the gripping members will be too small to hold a tape cassette. And if the heights of the griping members exceed three times the thicknesses of the members, the gripping members will be too large, so that the directional resistance of the members will be excessive, the force required to insert a tape cassette between the griping members will be comparatively large and usability will be deteriorated. Therefore, when the heights of the gripping members are set to be in a range from one to three times the thicknesses of the members, inserting a tape cassette will be easy, requiring the application of only a comparatively small insertion force, and usability will be superior. As an added dividend, the griping members will hold the tape cassette securely.

According to a third aspect of the invention, in the magnetic tape device of the first or the second aspect, the widths set, in the longitudinal direction, for the inner side faces of the gripping members are two to ten times the thicknesses of the members, and preferably are four to eight times the thicknesses.

With this arrangement, if the widths, in the longitudinal direction, of the inner side faces of the griping members are less than twice the thicknesses of the members, the widths of the gripping members will be too small to securely hold a tape cassette. And if the widths, in the longitudinal direction, of the inner side faces of the gripping members exceed ten times the thicknesses of the members, the griping members will be too wide and the friction resistance of the griping member will be increased, the force required to insert a tape cassette between the gripping members will be comparatively large and usability will be deteriorated. Therefore, when the widths set, in the longitudinal direction, for the inner side faces of the gripping members are two to ten times the thicknesses of the gripping members, preferably four to eight times the thicknesses, inserting a tape cassette between the gripping members will be easy, requiring the application of only a comparatively small insertion force. And as an added dividend, the inner faces of the gripping members will hold the tape cassette securely.

According to a fourth aspect of the invention, a magnetic tape device is provided wherein a moving table, which includes a bottom plate and a pair of side plates securely fixed to both side edges of the bottom plate, is located so as to move forward and backward between a cassette insertion position and a cassette mounting position that are set up between the guide plates;

wherein a tape cassette is inserted into the moving table that is held at the cassette insertion position, and the moving table is moved backward based on a detection signal emitted by the insertion, so that the tape cassette inserted into the moving table is mounted at the cassette mounting position; and Wherein a pair of integrally formed gripping members are projected from the inner side faces of the side plates and contact both side faces of the tape cassette inserted into the moving table.

With this arrangement, when a tape cassette is inserted into the moving table held at the cassette insertion position, the gripping members projected together from the side plates of the moving table are brought into contact with the side faces of the tape cassette. Thus, the tape cassette can be precisely held at a predetermined position in the moving table to prevent the tape cassette from wobbling unexpectedly when inserted and ejected.

Since the integrally formed gripping members are projected from the inner side faces of the side plates, the number of parts that is required is smaller than in the conventional case wherein leaf springs are used, and the structure can be simplified. Further, when the gripping members and the side plates are mass-produced and integrally formed of a synthetic resin, the manufacturing expenses can be reduced.

According to a fifth aspect, in the magnetic tape device of the fourth aspect, an integrally formed pair of floating prevention members are projected from the upper ends of the side plates toward the center of the moving table, and engage the upper edge of the tape cassette inserted into the moving table.

With this arrangement, when the tape cassette is held by the gripping members, the pair of float prevention members can be employed to prevent the tape cassette from floating. Further, since the float prevention members, together with the side plates, and the gripping members are mass-produced using a synthetic resin, the manufacturing expenses can be reduced.

According to a sixth aspect of the invention, in the magnetic tape device of the fifth aspect, the gripping members, at corner portions, are projected together between the floating prevention members and the side plates.

With the arrangement, the integrally formed float prevention members and gripping members are projected, substantially at right angles, from the upper ends of the side plates.

Thus, when a tape cassette is inserted into the moving table, the float prevention members and the gripping members are brought into contact with the upper edge corners of the side faces of the tape cassette, so that the tape cassette in the moving table can be securely held at a predetermined position.

According to a seventh aspect, in the magnetic tape device of one of the fourth to sixth aspects, the bottom plate is flexible, and when the tape cassette is inserted between the gripping members, pressure applied through the side plates flexes the bottom plate.

With this arrangement, the bottom plate is flexed by the insertion of a tape cassette between the gripping members, which generates an urging force. Through the application of the urging force, the gripping members are flexibly brought into contact with the side faces of the tape cassette, so that the tape cassette can be held in the moving table without wobbling.

According to an eighth aspect of the invention, in the magnetic tape device of the seventh aspect, the bottom plate is formed of flexible steel, and a reinforcing projection is formed inward, along to the moving table, by bending the steel plate, almost longitudinally, at the center.

With this arrangement, the bottom plate is formed of flexible steel, and the reinforcement projection is formed by bending the center portion of the bottom plate. When an urging force, exerting a predetermined pressure, is generated by pushing the tape cassette between the gripping members and bending the bottom plate, and when the urging force brings the gripping members into flexible contact with the side faces of the tape cassette, the tape cassette can be held in the moving table without wobbling unexpectedly.

According to a ninth aspect of the invention, in the magnetic tape device of one of the fourth to eighth aspects, the gripping members, in plan view, have a trapezoidal shape, and extend forward and backward along the side plates, from the longitudinal ends of the gripping members to the center of the moving table.

With this arrangement, a tape cassette can be smoothly inserted into the moving table along the inclined end faces of trapezoidal shaped gripping members, which serve as guide faces. Further, when the inner side faces of the gripping members are brought into contact with the side faces of the tape cassette, the tape cassette can be stably held in the moving table.

According to a tenth aspect of the invention, in the magnetic tape device of the ninth aspect, the heights of gripping members ranges from one to three times the thicknesses of the members.

With this arrangement, if the heights of gripping members are less than one times the thicknesses of the members, the gripping members are too small to hold a tape cassette. And if the heights of the gripping members exceed three times the thicknesses of the members, the gripping members are too large, and the friction resistance of the members is excessive. Thus, the force required to insert the tape cassette between the gripping members is comparatively large, and the usability is deteriorated. Therefore, when the heights set for the gripping members are one to three times the thicknesses of the members, inserting a tape cassette between the gripping members is easy, the force required to insert the tape cassette is comparatively small, and the usability is improved. As an added dividend, the gripping members can securely hold the tape cassette.

According to an eleventh aspect of the invention, in the magnetic tape device of the ninth or tenth aspect, the widths set, in the longitudinal direction, of the inner side faces of the gripping members is two to ten times the thicknesses of the members, and preferably, is four to eight times the thicknesses.

With this arrangement, when the widths, in the longitudinal direction, of the inner side faces of the gripping members is less than two times the thickness of the members, the widths of the gripping members are too small to hold a tape cassette. When the widths, in the longitudinal direction, of the inner side faces of the gripping members exceed ten times the thicknesses of the members, the gripping members are too large, and the friction resistance of the members is increased. Thus, the force required to insert a tape cassette between the gripping members is comparatively large, and the usability is deteriorated. Therefore, when the widths set for the inner side faces of the gripping members are two to ten times the thicknesses of the members, preferably, four to eight times the thicknesses, inserting a tape cassette between the gripping members is easy, the force required to insert the cassette between the gripping members is comparatively small, and the usability is improved. As an added dividend, the inner side faces of the gripping members can hold a tape cassette securely.

DETAILED DESCRIPTION OF THE PREFERRED EMBODIMENTS

Mode for Carrying out the Invention

Figure 10:
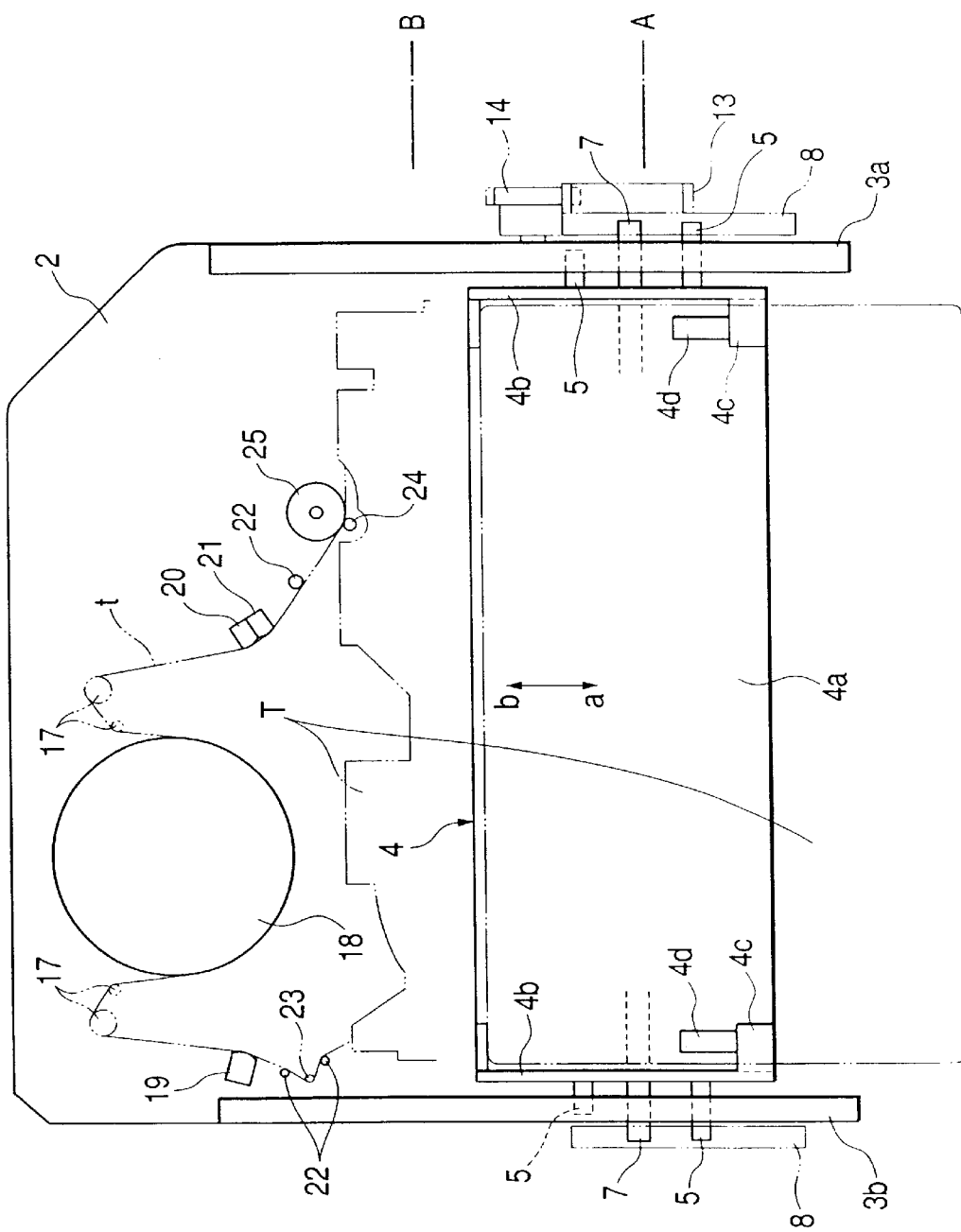
FIG. 10 is a schematic plan view of a conventional magnetic tape device.
Figure 11:
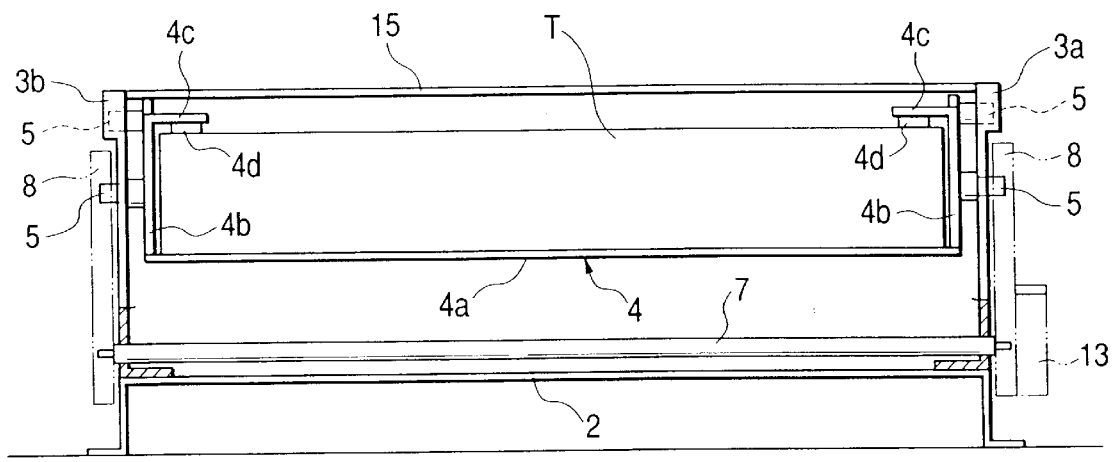
FIG. 11 is a partially cutaway front view of the conventional magnetic tape device.
Figure 12:
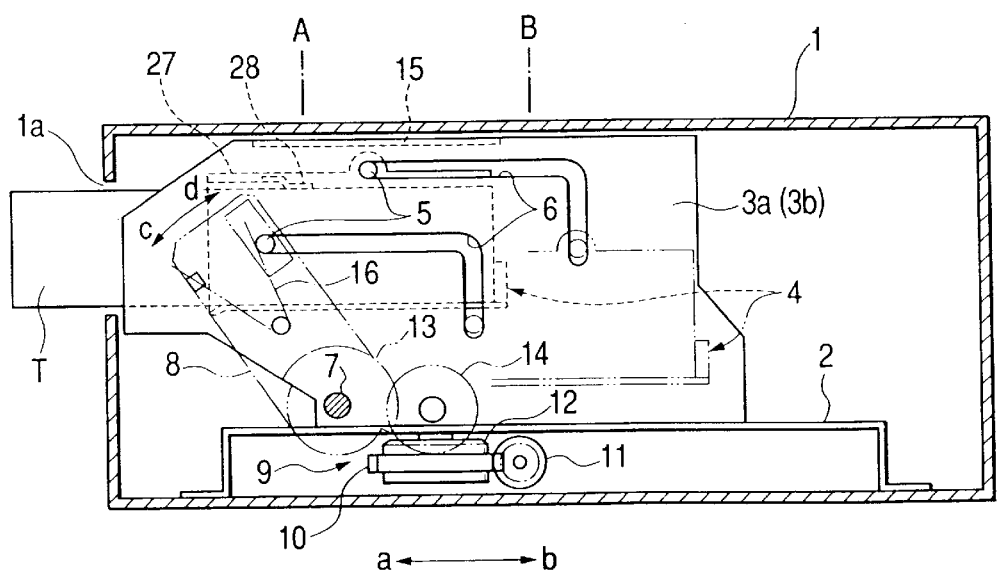
FIG. 12 is a partially cutaway side view of the conventional magnetic tape device.

FIGS. 1 to 6 are diagrams showing a magnetic tape device according to one embodiment of the invention. A pair of side plates 4b, of a moving table 4, are secured to both ends of a bottom plate 4a using fixing tools 33, such as small screws, and a pair of integrally formed gripping members 4e are projected from the inner side faces of the side plates 4b. Further, a pair of float prevention projections 4f are integrally formed on the upper ends of the side plates 4b, and rotary levers 8 and a rotary cam 9 are coupled together, via a slide plate 26, and move forward and backward with the moving table 4, in directions a and b. For the other components, the same reference numerals are employed as are used for corresponding components in FIGS. 10 to 12, and no further explanation for them will be given.

Figure 7:
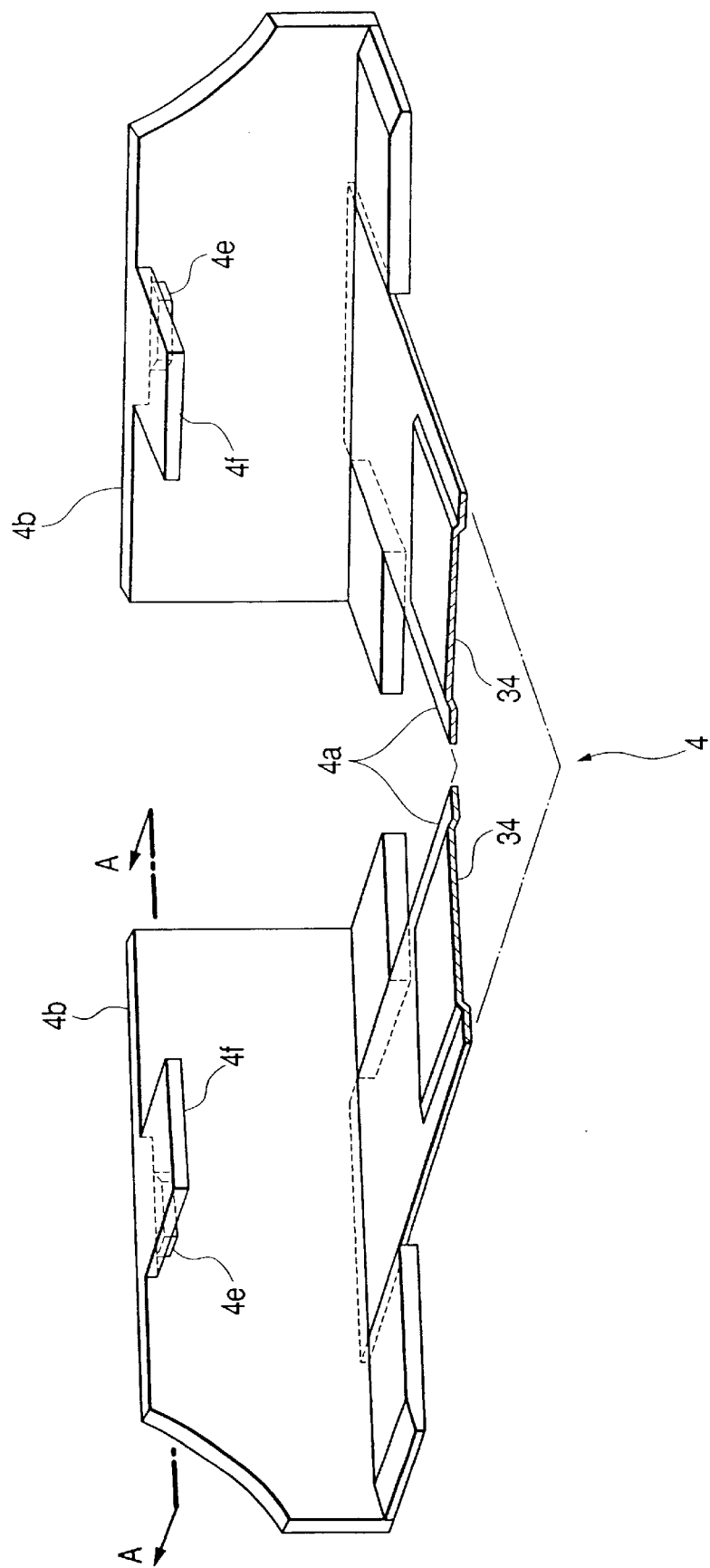
FIG. 7 is a perspective view of the moving table according to the embodiment.

As is shown in FIG. 7, the bottom plate 4a is a flexible steel plate, and a reinforcement projection 34 is formed inward, along the moving table 4 by bending the steel plate, almost longitudinally, at the center. The shape of the steel plate is flexibly changed by bending it upward at the center, which generates a predetermined urging force (see FIG. 9B).

As shown in FIGS. 7 and 8A to 8C, in plan view, the float prevention projections 4f are substantially rectangular, and are integrally formed and projected from the upper ends of the side plates 4b toward the center of the moving table 4. An inclined face 60 is formed at the lower edges of the front and rear faces, and a tape cassette T inserted into the moving table 4 along this inclined face 60 is prevented from floating.

As is shown in FIGS. 7 and 8A to 8C, the gripping members 4e are formed at the corners, between the floating prevention projections 4f and the side plates 4b, and are located opposite the floating prevention projections 4f at substantially right angles α. Since the gripping members 4e are extended forward and backward along the side plates 4b, in directions a and b, and both end faces 61 are inclined toward the center of the moving table 4, in plan view, the gripping members 4e have trapezoidal shapes. When a tape cassette T is inserted into the moving table 4 along the inclined end faces 61, the gripping members 4e are brought into contact with the side faces of the tape cassette T, and holds it at a predetermined position in the moving table 4.

With this arrangement, since the gripping members 4e are integrally formed with the inner side faces of the side plates 4b, the required number of parts is reduced and the structure is simplified, when compared with the conventional case wherein leaf springs (see FIGS. 10 to 12) are employed. When the gripping members 4e, together with the float prevention projections 4f are mass-produced with the side plates 4b by using a synthetic resin, the manufacturing costs can be reduced.

Figure 8A:
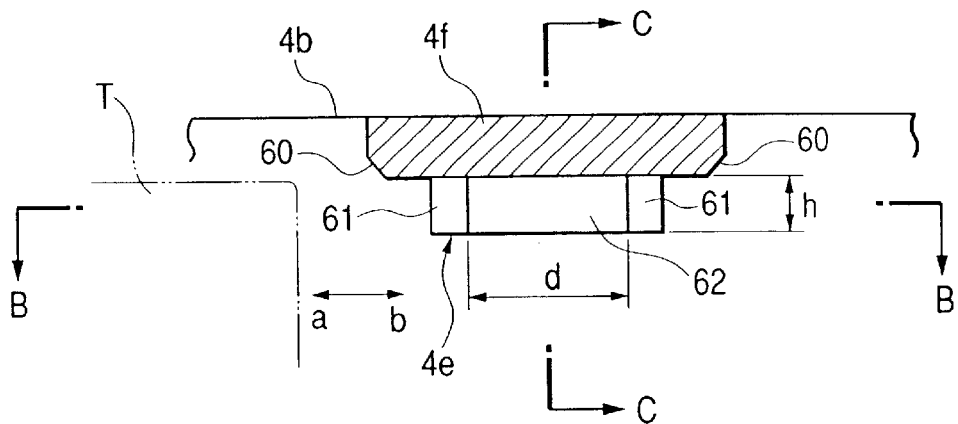
FIG. 8A is a diagram viewed from the direction A—A in FIG. 7.
Figure 8B:
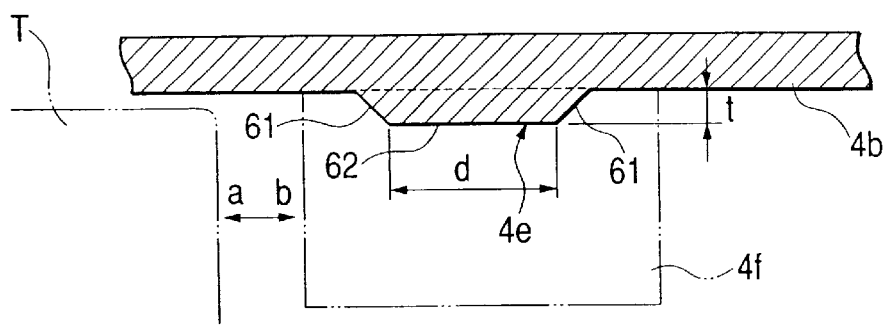
FIG. 8B is a diagram viewed from the direction B—B in FIG. 8A.
Figure 8C:
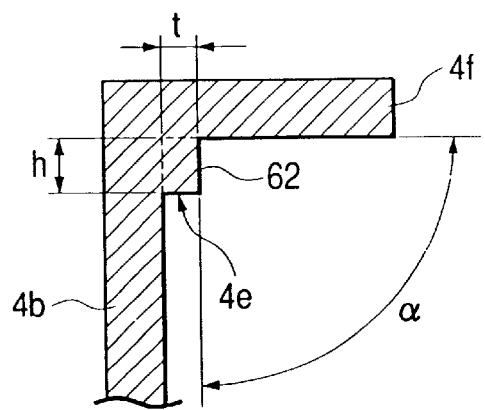
FIG. 8C is a diagram viewed from the direction C—C in FIG. 8A.

As is shown in FIGS. 8A to 8C, the heights h set for the gripping members 4e range from one to three times the thicknesses t of the members. If the heights h are less than one times the thicknesses, the gripping members 4e are too low to securely hold a tape cassette T. And if the heights h exceed three times the thicknesses t, the gripping members 4e are so large that the friction resistance of the gripping members 4e is increased and the force required to insert a tape cassette T between the gripping members 4e is comparatively large, deteriorating usability. Thus, since the heights h range from one to three times the thicknesses t, inserting a tape cassette T between the gripping members 4e is easy, the force required is comparatively small, and the usability is improved. As an added dividend, the tape cassette T can be held securely by the gripping members 4e.

The widths d forward and backward, in directions a and b, set for the inner side faces 62 of the gripping members 4e, are two to ten times the thicknesses t of the gripping members 4e, and are preferably four to eight times the thicknesses t. If the widths d are less than two times the thicknesses t, the widths d of the gripping members 4 are too small to securely hold the tape cassette T. And if the widths d exceed ten times the thicknesses t, the gripping members 4e are so wide that the friction resistance of the gripping members 4e is increased and the force required to insert the tape cassette T between the gripping members 4e is comparatively large, deteriorating usability. Thus, since the widths d range from two to ten times the thicknesses t, inserting a tape cassette T between the inner side faces 62 of the gripping members 4e is easy, and the insertion force required is comparatively small. As an added dividend, the tape cassette T can be held securely by the inner side faces 62 of the gripping members 4e.

Specifically, when the thicknesses t set for the gripping members 4e range from 1 to 2 mm, the heights h are 1 to 6 mm and the widths d are 2 to 20 mm (preferably 4 to 16 mm).

As is shown in FIGS. 2 to 6, the slide plate 26 includes a main slide body 26a, positioned so that it slides along a right guide plate 3a; and a bent member 26b, which has substantially an L shape, beginning at the lower edge of the main slide body 26a and extending to the rotary cam 9. A rack 28 is formed at the bent member 26b and engages a pinion 27 of the rotary cam 9.

Figure 3:
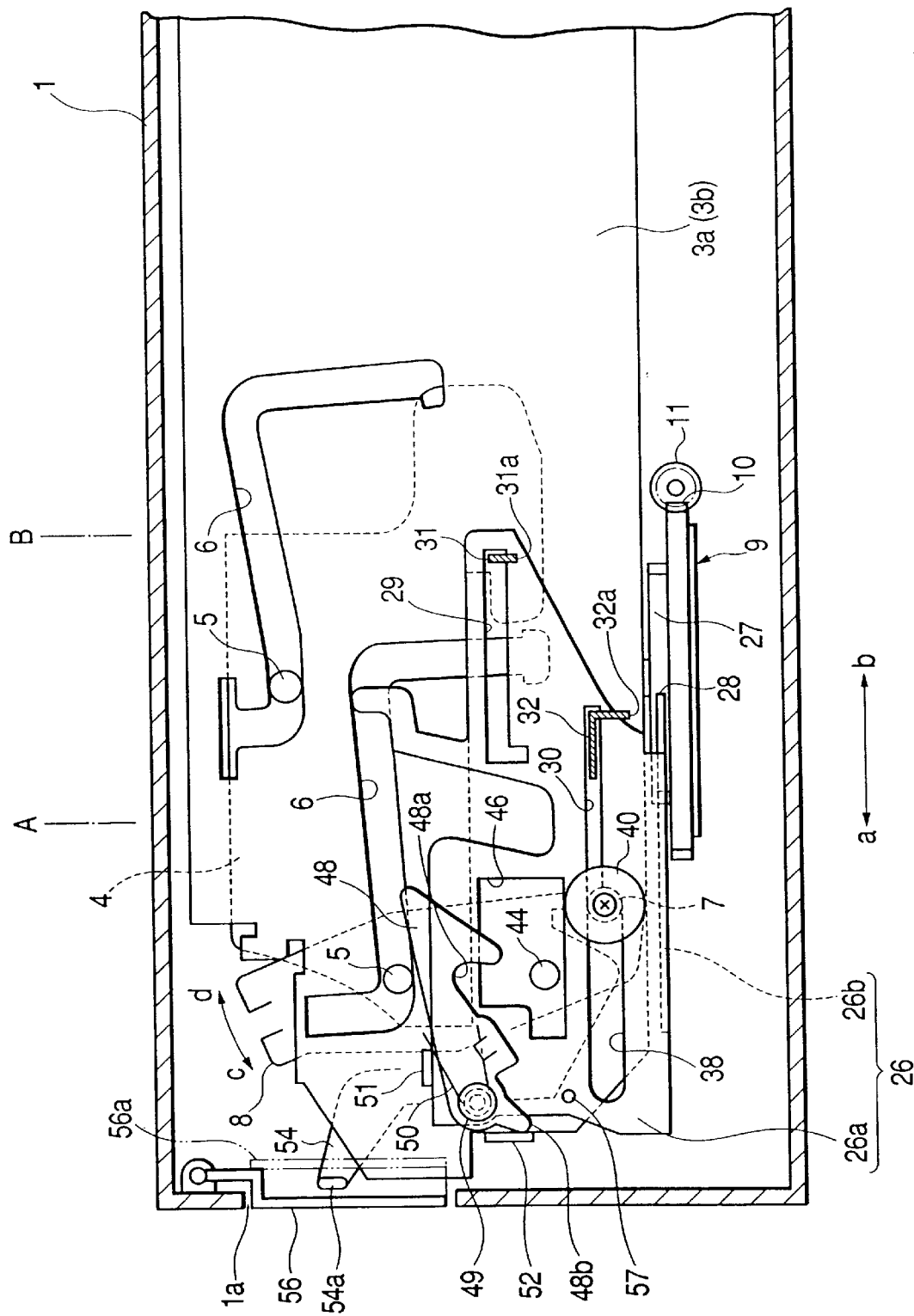
FIG. 3 is a partially cutaway enlarged side view of the state of the embodiment wherein the moving table is moved forward.

As is shown in FIG. 3, a pair of slits 29 and 30 are formed forward and backward in the main slide body 26a, in directions a and b, and support members 31 and 32, which project outward from the right guide plate 3a, are inserted through the slits 29 and 30. Stoppers 31a and 32a, which are formed by bending the distal ends of the support members 31 and 32, contact the outer side face of the main slide body 26a. With this structure, the slide plate 26 can be held so that it does not move vertically and is not separated from the right guide plate 3a.

Figure 1:
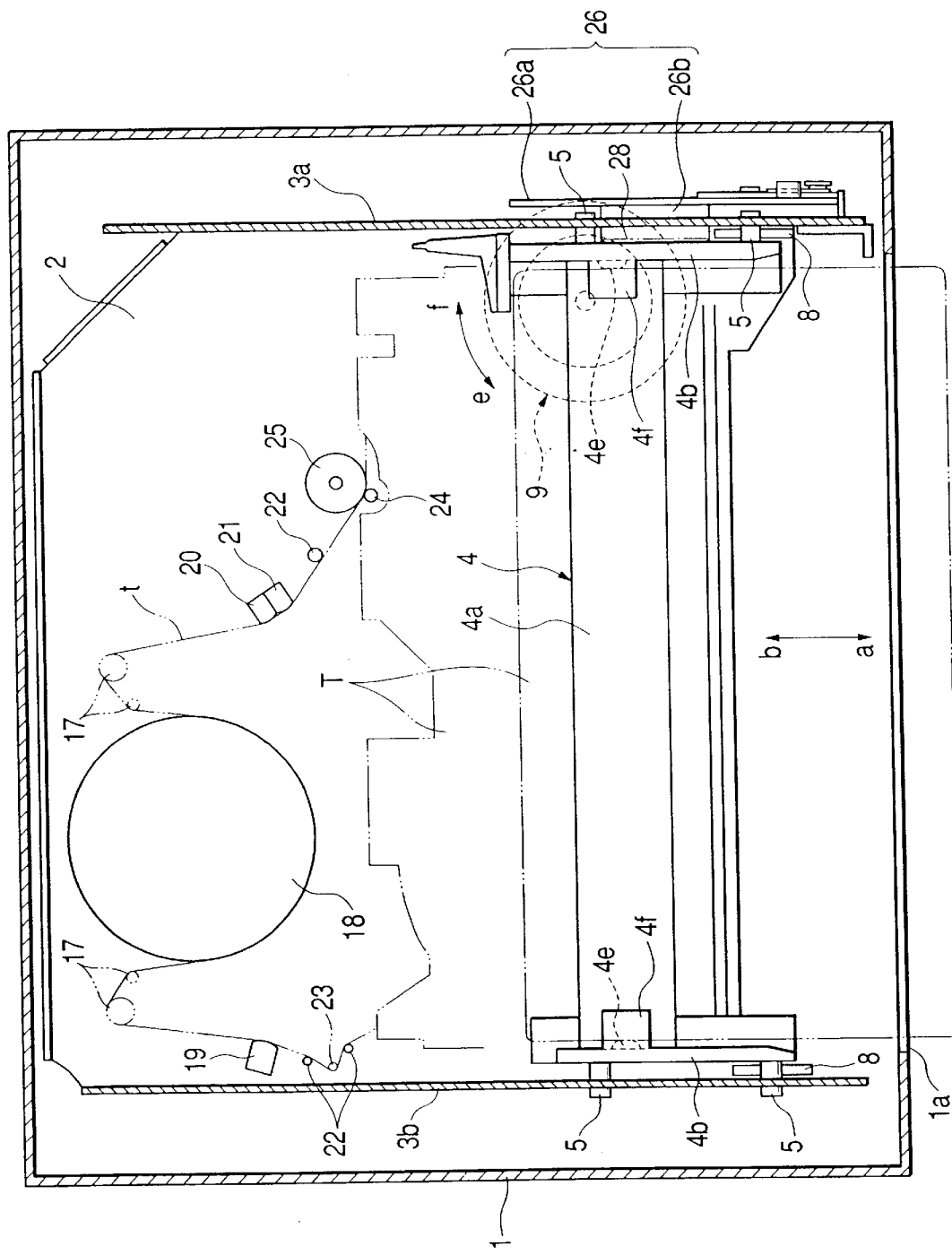
FIG. 1 is a schematic plan view of a magnetic tape device according to one embodiment of the present invention.
Figure 2:
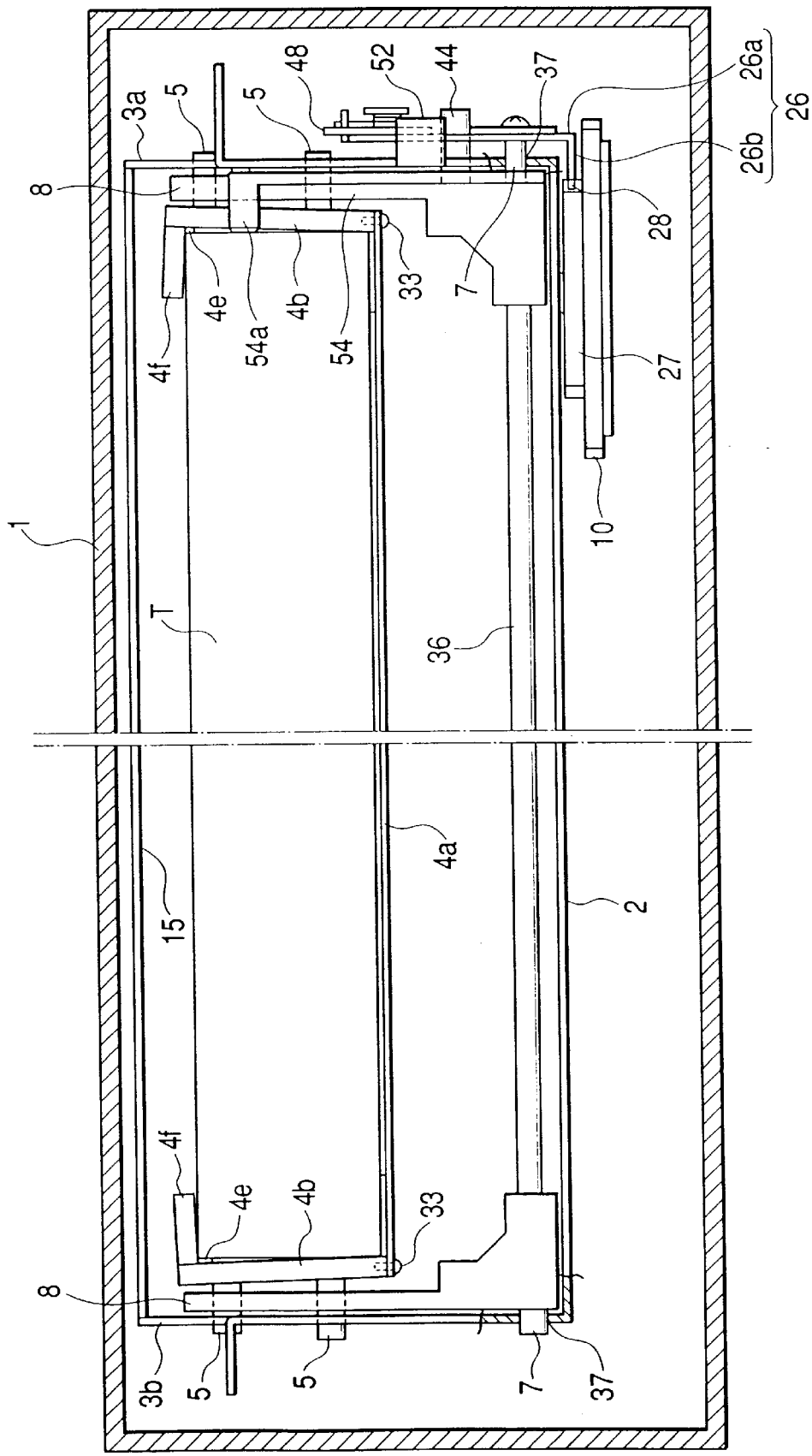
FIG. 2 is a partially cutaway enlarged front view of the magnetic tape device.
Figure 6:
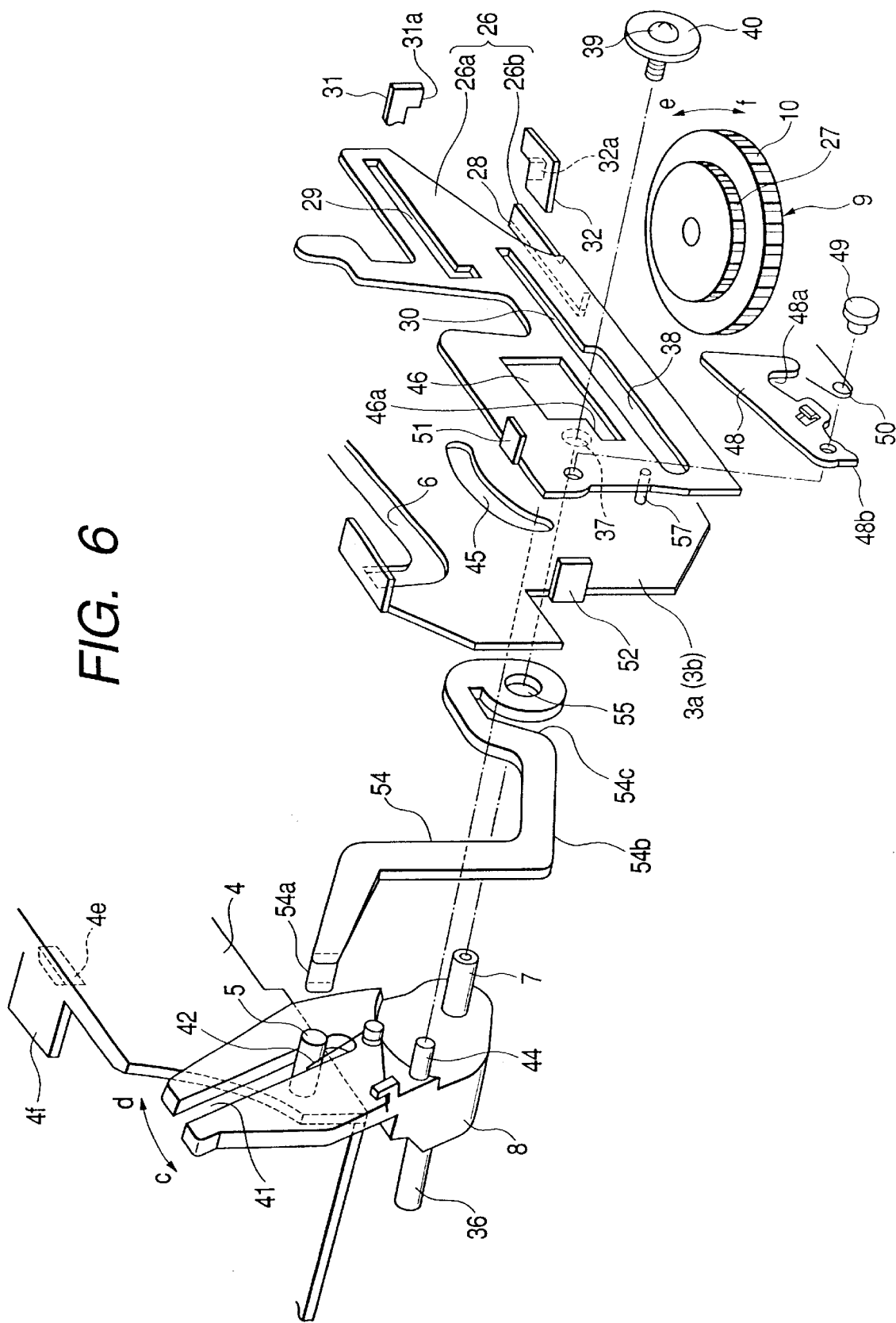
FIG. 6 is an exploded perspective view of the essential portion of the embodiment.

As is shown in FIGS. 2 and 6, the paired rotary levers 8 are formed inside the guide plates 3a and 3b, and are coupled together via a coupling shaft 36. Further, a fitting shaft 7, which projects outward from the outer side faces of the rotary levers 8 and is coaxially arranged with the coupling shaft 36, is rotatably inserted into through holes 37 in the chassis 2. The fitting shaft 7 on the right rotary lever 8 side is inserted into a long hole 38, which is formed forward and backward in the main slide body 26a, in directions a and b. Further, a stopper seat 40, which is securely fixed to the end face of the fitting shaft 7 by a small screw 39, is brought into contact with the outer side face of the main slide body 26a. Further, grooves 41 are extended from the distal ends of the rotary levers 8 to the base ends, and engage the guide pins 5 projecting from both side faces of the moving table 4. The ends of pressing springs 42 engage the guide pins 5.

As is shown in FIGS. 3 and 6, an engagement pin 44, projecting from the right rotary lever 8, is inserted through a through hole 45 in the right guide plate 3a and into an engagement hole 46 formed in the main slide body 26a. As is shown in FIG. 3, while the moving table 4 is held at the cassette insertion position A, the slide plate 26 is moved backward and the circumferential edge of the engagement hole 46 is used to drive the engagement pin 44. Then, the rotary lever 8 can be pivoted in the reverse direction d and can shift the moving table 4 backward, in direction b, toward the cassette mounting position B. With this arrangement, since the engagement pin 44 need only be fitted into the engagement hole 46, the structure can be simplified and the manufacturing costs can be reduced.

As is shown in FIGS. 3 and 6, an arched locking groove 48a, which can engage the engagement pin 44, is formed at the distal end of a locking lever 48. The base end of the locking lever 48 is fitted over a fitting shaft 49 at the upper front portion of the main slide body 26a. With this arrangement, one end of an engagement spring 50, wound around the fitting shaft 49, engages the locking lever 48, while the other end of the engagement spring 50 engages an engagement member 51 that is bent at the upper end of the main slide plate 26. As a result, the locking lever 48 is driven toward the engagement pin 44, and a protrusion 48b is formed at the base end of the locking lever 48 opposite an unlocking member 52, which is bent beginning at the front end of the right guide plate 3a.

Figure 4:
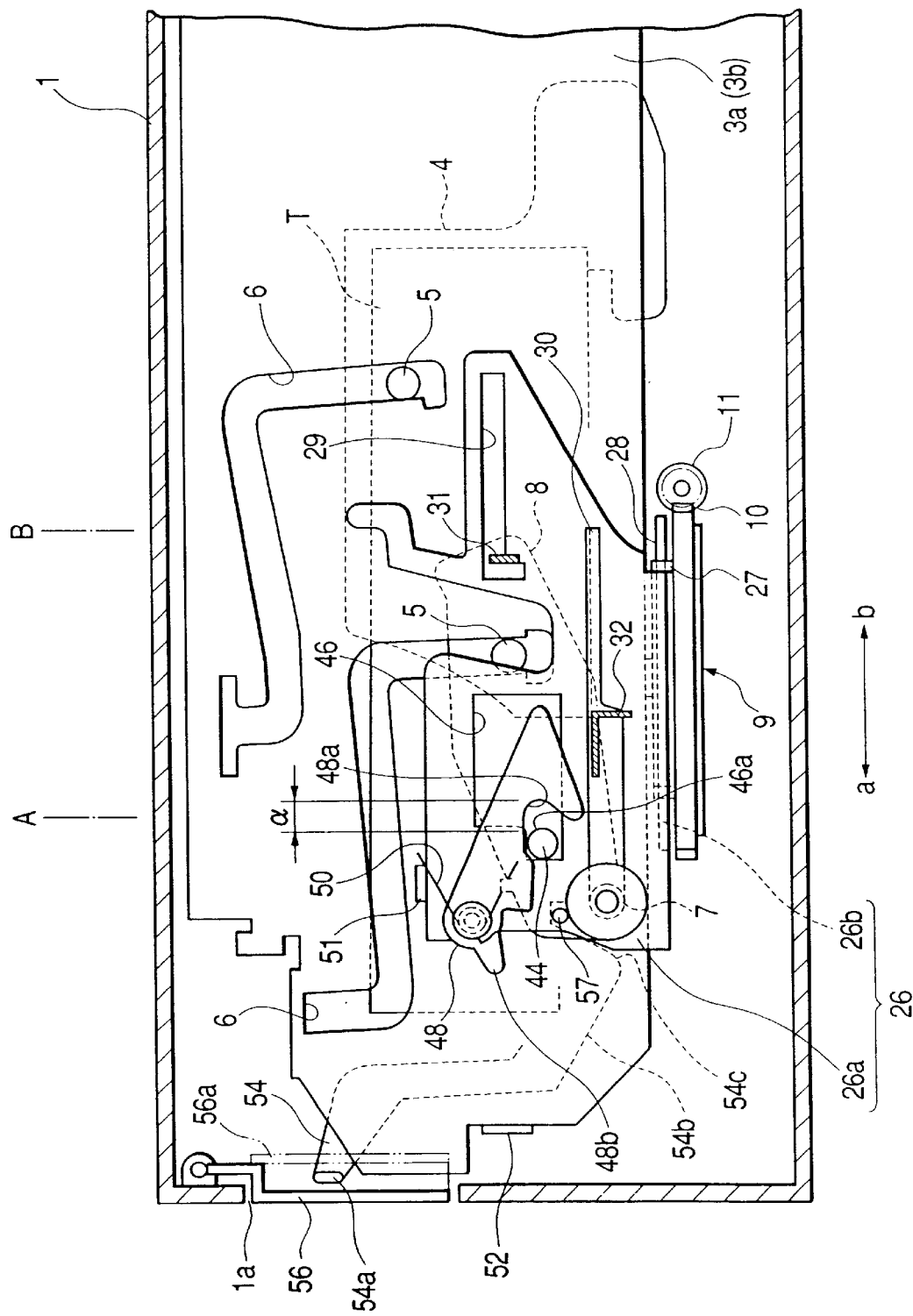
FIG. 4 is a partially cutaway enlarged side view of the state of the embodiment wherein the moving table is moved backward.
Figure 5:
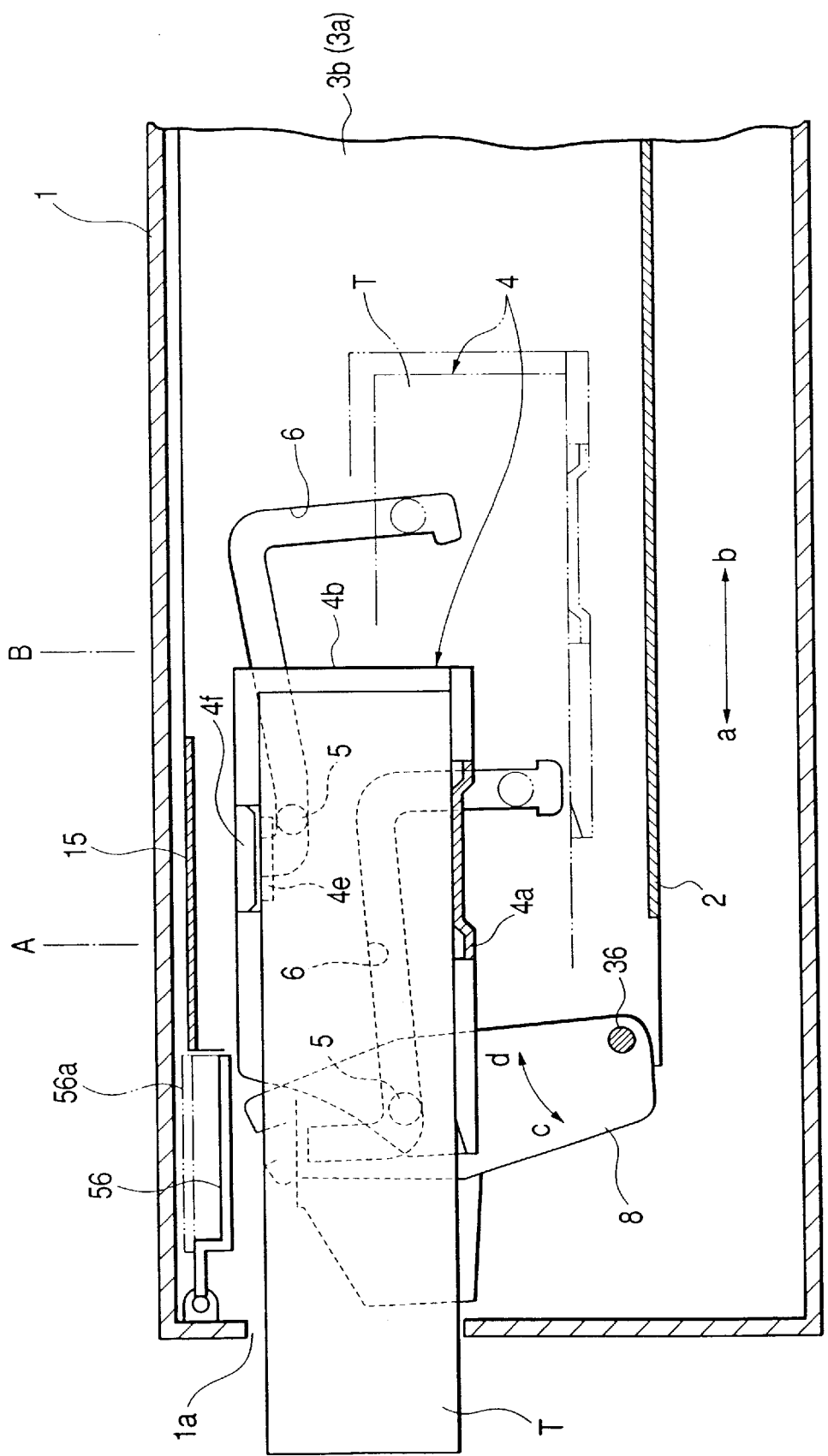
FIG. 5 is an enlarged vertical cross-sectional view of the state of the embodiment wherein a tape cassette is inserted.

With this arrangement, as is shown in FIG. 4, while the moving table 4 is located at the cassette mounting position B, the slide plate 26 is pushed forward as a consequence of the emission of an ejection signal, and accordingly, the locking lever 48 is also moved forward. In the pre-sliding state, a gap $\alpha$, substantially as large as the diameter of the engagement pin 44, is defined between the locking groove 48a and the engagement pin 44, and a slight time lag is generated before the locking groove 48a engages the engagement pin 44. Therefore, before the moving table 4 is moved forward, in direction a, because of the time lag, a door 56 in the tape cassette insertion slot 1a can be opened. Sequentially, thereafter, since the locking groove 48a engages the engagement pin 44 as the slide plate 26 moves forward, the rotary levers 8 are pivoted forward, in direction c, and the moving table 4 is moved forward, in direction a. Thus, a tape cassette T loaded in the moving table 4 can be ejected without striking the door 56.

When the moving table 4 is moved forward, in direction a, to the cassette insertion position A (see FIG. 3), the protrusion 48b of the locking lever 48 engages the unlocking member 52 to separate, against the force exerted by the engagement spring 50, the locking lever 48 from the engagement pin 44. Thus, when the tape cassette T is to be inserted into the moving table 4, held at the cassette insertion position A (see FIG. 5), the moving table 4 is permitted to move backward, in direction b, and this movement can be detected by a detector. While the function of the locking lever 48 corresponds to the function of a conventional clutch, the structure is simpler than a clutch and the manufacturing costs are less.

In FIGS. 4 and 6, a float prevention member 46a is formed at the circumferential edge of the engagement hole 46. When the moving table 4 is moved backward, in direction b, to the cassette mounting position B, the float prevention member 4a contacts or approaches the upper end of the engagement pin 44 to prevent the moving table 4 from being raised. A through hole 55 in the base end of a door opening lever 54 is rotatably fitted over the fitting shaft 7, and a distal end 54a engages a circumferential side 56a of the door 56. When the slide plate 26 is moved forward and backward, an open pin 57 projecting from the slide plate 26 is brought into contact with inclined faces 54b and 54c of the door opening lever 54. Thus, the door opening lever 54 is pivoted and opens the door 56 (see FIG. 5).

Figure 9A:
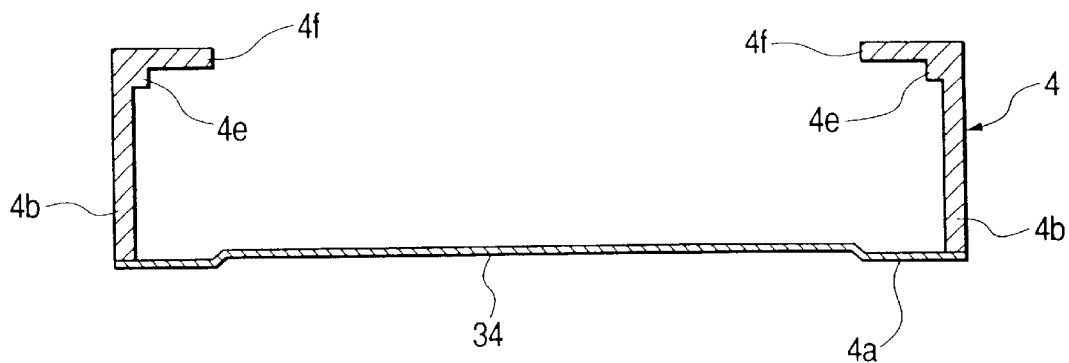
FIG. 9A is a horizontal cross-sectional view of a moving table before a tape cassette is inserted.
Figure 9B:
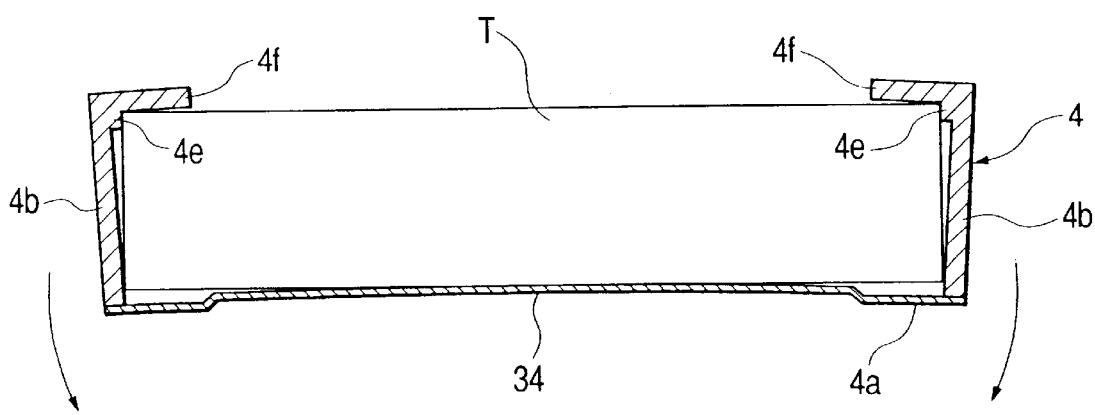
FIG. 9B is a horizontal cross-sectional view of the moving table after a tape cassette has been inserted.

The operation of this arrangement will now be described. While as shown in FIG. 3, the moving table 4 is held at the cassette insertion position A, as shown in FIG. 9A, the horizontal disposition of the bottom plate 4a of the moving table 4 is maintained, as is the vertical disposition of the side plates 4b. In this state, when a tape cassette T is inserted into the moving table 4 during the insertion process, as is shown in FIG. 9B, the gripping members 4e are spread apart, to either side, by the tape cassette T, and the bottom plate 4a is flexed. Thus, while the lower face of the tape cassette T is supported by the reinforcement projection 34 of the bottom plate 4a, the float prevention members 4f and the gripping members 4e are brought into contact with the upper edge corners of the side faces of the tape cassette T, where the tape cassette T is prevented from being raised. Further, the urging force that is generated by flexing the bottom plate 4a is used to force the gripping members 4e to flexibly contact the side faces of the tape cassette T, so that the tape cassette T is held in a predetermined position and does not wobble unexpectedly.

As is described above, when a tape cassette T is inserted into the moving table 4, the moving table 4 is pushed backward, in direction b, and based on a detection signal emitted by the detector of this movement, the mode is changed to automatic loading. The rotary cam 9 is rotated forward, in direction e, by the driving power transmitted by the worm gears 11 and 10, and the slide plate 26 is moved rearward, by the pinion 27 of the rotary cam 9 and the rack 28. Then, while the engagement pin 44 is impelled by the circumferential edge of the engagement hole 46, by rotating the rotary levers 8 in the reverse direction d, the moving table 4 is pushed horizontally backward, in direction b, along the guide hole 6 until it descends vertically, so that the tape cassette T is mounted at the cassette mounting position B (see FIG. 4). Thereafter, the magnetic tape t is extracted from the tape cassette T (see FIG. 1) and reproduction and other operations are performed.

As the slide plate 26 is moved backward, the protrusion 48b of the locking lever 48 is separated from the unlocking member 52, and the locking lever 48 is rotated downward by the engagement spring 50 until it contacts the engagement pin 44. At this time, the gap $\alpha$, which is substantially as large as the diameter of the engagement pin 44, is defined between the engagement pin 44 and the locking groove 48a (see FIG. 4).

Further, the float prevention member 46a, which is formed at the circumferential edge of the engagement hole 46, is brought into contact with or approaches the upper edge of the engagement pin 44 (see FIG. 4). Thus, since the moving table 4 is prevented from being raised at the cassette mounting position B, the magnetic tape t can be smoothly extracted from the tape cassette T loaded into the moving table 4, and a clear image can be reproduced.

Upon depression of the eject button (not shown), based on the ejection signal that is produced, the rotary cam 9 is rotated by the drive source in the reverse direction f so that the slide plate 26 is moved forward through the pinion 27 of the rotary cam 9 and the rack 28. Therefore, the open pin 57 is pushed against the rear inclined face 54c of the door open lever 54, and the door open lever is pivoted upward and opens the door 56. Thereafter, the locking groove 48a of the locking lever 48 engages the engagement pin 44, and the rotary levers 8 are rotated forward, in direction c, to raise the moving table 4 vertically along the guide hole 6 and move the moving table 4 horizontally forward, in direction a, to the cassette insertion position A. As a result, the tape cassette T is ejected (see FIG. 5).

Advantages of the Invention

According to the first aspect of the invention, the integrally formed float prevention members and gripping members are projected substantially at right angles at the upper ends of the side plates of the moving table. Therefore, when a tape cassette is inserted into the moving table, the float prevention members and the gripping members are brought into contact with the upper edge corners of the side faces of the tape cassette, so that the tape cassette can be securely held in a predetermined position in the moving table.

Further, the bottom plate is formed of flexible steel, and the reinforcement projection is formed by bending the center portion of the bottom plate. With this arrangement, an urging force exerting a predetermined pressure is generated by pushing the tape cassette between the gripping members, thereby flexing the bottom plate and forcing the gripping members flexibly against the side faces of the tape cassette, holding the tape cassette in the moving table so that it will not wobble unexpectedly.

Further, when the inclined end faces of the trapezoidal shaped gripping members are used as guide faces, the tape cassette can be smoothly inserted into the moving table. Further, since the inner side faces of the gripping members can contact both side faces of the tape cassette, the tape cassette can be stably held in the moving table.

Since an integrally formed pair of gripping members are projected from the inner side faces of the side plates, the number of parts is smaller than in the conventional case, wherein leaf springs are used, and the structure is simpler. When the gripping members and the floating prevention members, as well as the side plates, are formed of a synthetic resin, the manufacturing costs can be reduced.

According to the second aspect of the invention, if the heights of the gripping members are less than the thicknesses of the members, the gripping members will be too small to hold a tape cassette. And if the heights of the griping members exceed three times the thicknesses of the members, the gripping members will be too large, so that the directional resistance of the members will be excessive, the force required to insert a tape cassette between the griping members will be comparatively large and usability will be deteriorated. Therefore, when the heights of the gripping members are set to be in a range from one to three times the thicknesses thereof, inserting a tape cassette will be easy, requiring the application of only a comparatively small insertion force, and usability will be superior. As an added dividend, the griping members will hold the tape cassette securely.

According to the third aspect of the invention, if the widths, in the longitudinal direction, of the inner side faces of the griping members are less than twice the thicknesses of the members, the widths of the gripping members will be too small to securely hold a tape cassette. And if the widths, in the longitudinal direction, of the inner side faces of the gripping members exceed ten times the thicknesses of the members, the gripping members will be too wide and the friction resistance of the griping member will be increased, the force required to insert a tape cassette between the gripping members will be comparatively large and usability will be deteriorated. Therefore, when the widths set, in the longitudinal direction, for the inner side faces of the gripping members are two to ten times the thicknesses of the gripping members, preferably four to eight times the thicknesses, inserting a tape cassette between the gripping members will be easy, requiring the application of only a comparatively small insertion force. And as an added dividend, the inner faces of the gripping members will hold the tape cassette securely.

According to the fourth aspect of the invention, when a tape cassette is inserted into the moving table held at the cassette insertion position, the gripping members projected together from the side plates of the moving table are brought into contact with the side faces of the tape cassette. Thus, the tape cassette can be precisely held at a predetermined position in the moving table to prevent the tape cassette from wobbling unexpectedly when inserted and ejected.

Since the integrally formed gripping members are projected from the inner side faces of the side plates, the number of parts that is required is smaller than in the conventional case wherein leaf springs are used, and the structure can be simplified. Further, when the gripping members and the side plates are mass-produced and integrally formed of a synthetic resin, the manufacturing expenses can be reduced.

According to the fifth aspect of the invention, when the tape cassette is held by the gripping members, the pair of float prevention members can be employed to prevent the tape cassette from floating. Further, since the float prevention members, together with the side plates, and the gripping members are mass-produced using a synthetic resin, the manufacturing expenses can be reduced.

According to the sixth aspect of the invention, the integrally formed float prevention members and gripping members are projected, substantially at right angles, from the upper ends of the side plates. Thus, when a tape cassette is inserted into the moving table, the float prevention members and the gripping members are brought into contact with the upper edge corners of the side faces of the tape cassette, so that the tape cassette in the moving table can be securely held at a predetermined position.

According to the seventh aspect of the invention, the bottom plate is flexed by the insertion of a tape cassette between the gripping members, which generates an urging force. Through the application of the urging force, the gripping members are flexibly brought into contact with the side faces of the tape cassette, so that the tape cassette can be held in the moving table without wobbling.

According to the eighth aspect of the invention, the bottom plate is formed of flexible steel, and the reinforcement projection is formed by bending the center portion of the bottom plate. When an urging force, exerting a predetermined pressure, is generated by pushing the tape cassette between the gripping members and bending the bottom plate, and when the urging force brings the gripping members into flexible contact with the side faces of the tape cassette, the tape cassette can be held in the moving table without wobbling unexpectedly.

According to the ninth aspect of the invention, a tape cassette can be smoothly inserted into the moving table along the inclined end faces of trapezoidal shaped gripping members, which serve as guide faces. Further, when the inner side faces of the gripping members are brought into contact with the side faces of the tape cassette, the tape cassette can be stably held in the moving table.

According to the tenth aspect of the invention, if the heights of gripping members are less than one times the thicknesses of the members, the gripping members are too small to hold a tape cassette. And if the heights of the gripping members exceed three times the thicknesses of the members, the gripping members are too large, and the friction resistance of the members is excessive. Thus, the force required to insert the tape cassette between the gripping members is comparatively large, and the usability is deteriorated. Therefore, when the heights set for the gripping members are one to three times the thicknesses of the members, inserting a tape cassette between the gripping members is easy, the force required to insert the tape cassette is comparatively small, and the usability is improved. As an added dividend, the gripping members can securely hold the tape cassette.

According to the eleventh aspect of the invention, when the widths, in the longitudinal direction, of the inner side faces of the gripping members is less than two times the thickness of the members, the widths of the gripping members are too small to hold a tape cassette. When the widths, in the longitudinal direction, of the inner side faces of the gripping members exceed ten times the thicknesses of the members, the gripping members are too large, and the friction resistance of the members is increased. Thus, the force required to insert a tape cassette between the gripping members is comparatively large, and the usability is deteriorated. Therefore, when the widths set for the inner side faces of the gripping members are two to ten times the thicknesses of the members, preferably, four to eight times the thicknesses, inserting a tape cassette between the gripping members is easy, the force required to insert the cassette between the gripping members is comparatively small, and the usability is improved. As an added dividend, the inner side faces of the gripping members can hold a tape cassette securely.

What is claimed is:

1. A magnetic tape device comprising:
   a moving table which includes a bottom plate and a pair of side plates securely fixed to side edges of said bottom plate, and is positioned so as to move forward and backward between a cassette insertion position and a cassette mounting position located between a pair of guide plates;
   a tape cassette being inserted into and held in said moving table, located at said cassette insertion position, and said moving table being moved backward based on a detection signal produced upon the insertion of tape cassette, so that said tape cassette, in said moving table, being mounted at said cassette mounting position;
   a pair of integrally formed float prevention members, which project inward from the upper ends of said side plates, toward the center of said moving table, and engage the upper edge of said tape cassette that is held in said moving table; and
   a pair of projecting gripping members contact both side faces of said tape cassette inserted into and held in said moving table;
   wherein said gripping members have a substantially trapezoid shape in plan view, said gripping members extending forward and backward along said side plates and inclining at both longitudinal ends toward the center of said moving table;
   said bottom plate, made of flexible steel, is bent in the center to form a substantially longitudinal reinforcing projection extending upward toward said moving table; and
   when said side faces of said tape cassette inserted into said moving table are brought into contact with said gripping members, said bottom plate is flexed, and the urging force thus generated presses said gripping members flexibly against said side faces of said tape cassette.

2. The magnetic tape device according to claim 1, wherein the heights of said gripping members are set to be in a range from one to three times the thicknesses thereof.

3. The magnetic tape device according to claim 1, wherein the widths set, in the longitudinal direction, for the inner side faces of said gripping members are two to ten times the thicknesses of said members, and preferably are four to eight times the thicknesses.

4. A magnetic tape device comprising:
   a moving table, which includes a bottom elate and a pair of side plates securely fixed to both side edges of said bottom plate, is located so as to move forward and backward between a cassette insertion position and a cassette mounting position that are set up between said guide plates;
   a tape cassette being inserted into said moving table that is held at said cassette insertion position, and said moving table being moved backward based on a detection signal emitted by the insertion, so that said tape cassette inserted into said moving table is mounted at said cassette mounting position; and
   a pair of integrally formed gripping members which are projected from the inner side faces of said side plates and contact both side faces of said tape cassette inserted into said moving table,
   wherein an integrally formed pair of floating prevention members are projected from the upper ends of said side plates toward the center of said moving table, and engage the upper edge of said tape cassette inserted into said moving table, and
   wherein said gripping members, at corner portions, are projected together between said floating prevention members and said side plates.

5. A magnetic tape device comprising:
   a moving table, which includes a bottom plate and a pair of side plates securely fixed to both side edges of said bottom plate, is located so as to move forward and backward between a cassette insertion position and a cassette mounting position that are set up between said guide plates;
   a tape cassette being inserted into said moving table that is held at said cassette insertion position, and said moving table being moved backward based on a detection signal emitted by the insertion, so that said tape cassette inserted into said moving table is mounted at said cassette mountin position; and
   a pair of integrally formed gripping members which are projected from the inner side faces of said side plates and contact both side faces of said tape cassette inserted into said moving table,
   wherein said bottom plate is flexible, and when said tape cassette is inserted between said gripping members, pressure applied through said side plates flexes said bottom plate.

6. The magnetic tape device according to claim 5, wherein said bottom plate is formed of flexible steel, and a reinforcing projection is formed inward, along to said moving table, by bending said steel plate, almost longitudinally, at the center.

* * * * *